Nov. 30, 1926.

E. G. McDONALD 1,608,605

OPERATING DEVICE

Filed July 19, 1926

INVENTOR
EUGENE G. McDONALD
BY
M. W. McConkey
ATTORNEY

Patented Nov. 30, 1926.

1,608,605

UNITED STATES PATENT OFFICE.

EUGENE G. McDONALD, OF SOUTH BEND, INDIANA, ASSIGNOR TO BENDIX BRAKE COMPANY, OF CHICAGO, ILLINOIS, A CORPORATION OF ILLINOIS.

OPERATING DEVICE.

Application filed July 19, 1926. Serial No. 123,365.

This invention relates to devices for operating shafts and the like, and is illustrated as embodied in a connection between an operating arm or lever and the camshaft of a brake for an automobile wheel. An object of the invention is to provide a simple and inexpensive adjustment for mounting the arm or its equivalent on the shaft, and which is so constructed as to be extremely strong.

In one desirable arrangement, the arm or the like carries a novel adjusting member in a hub embracing the shaft, the adjusting member engaging the shaft in such a manner as to adjust the arm and shaft by its lengthwise movement, for example by providing it with rack teeth meshing with pinion teeth on the shaft. Preferably the adjusting member bridges across a slot in the hub of the arm, so that means such as nuts threaded on its ends may be provided for contracting the hub about the shaft.

I consider it highly desirable that the adjusting member should be cylindrical in form, and arranged in a cylindrical cross bore in the hub, and prefer that the rack teeth or their equivalent should be formed in a flattened intermediate part of the adjusting member, this construction also serving to prevent the member from turning about its axis.

The above and other objects and features of the invention, including novel means for preventing axial movement of the shaft and various other novel combinations of parts and desirable particular constructions, will be apparent from the following description of one illustrative embodiment shown in the accompanying drawing, in which.

Figure 1:
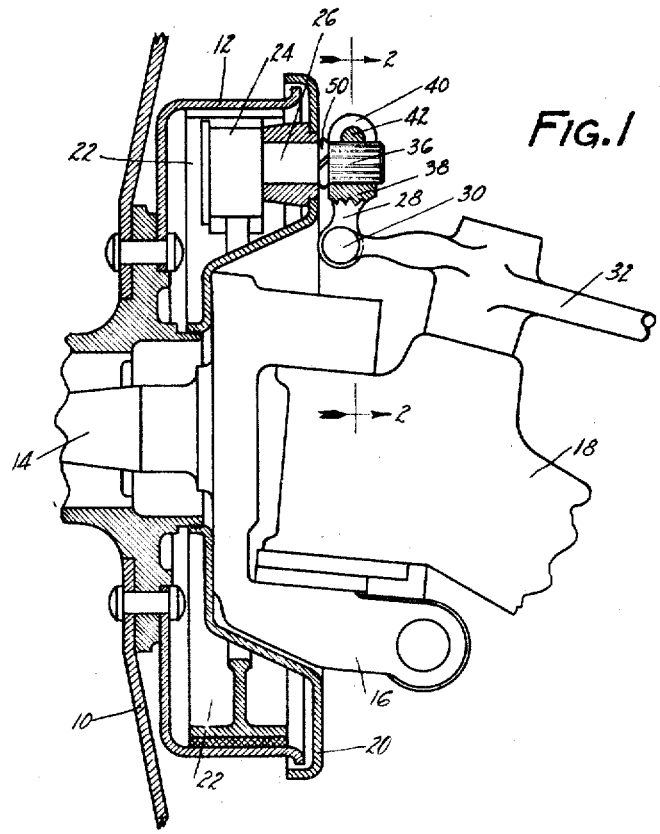
Figure 1 is a vertical section through a front wheel brake and associated parts, showing an operating arm secured by my novel adjustment on the camshaft.

The construction illustrated in Figure 1 includes a wheel 10 having a brake drum 12 and rotataby mounted on the spindle 14 of a knuckle 16 swivelled, by a king pin or the like, at the end of an axle 18. At the open side of drum 12 is a suitable support such as a backing plate 20, on which are anchored brake shoes 22 applied by means such as a cam 24 on or integral with a camshaft 26. Shaft 26 is rocked to apply the brake by a crank arm 28 engaged by an integral ball 30 on the end of a brake-applying lever 32 fulcrumed on axle 18.

In connection with the arrangement described above, my novel adjustment is used to connect arm or lever 28 to shaft 26, to permit correction of the position of the joint between levers 28 and 32 with respect to the steering axis about which wheel 10 swivels in steering, as the brake lining wears away. This use is merely illustrative, however, as the adjustment is capable of many and varied other uses.

Figure 2:
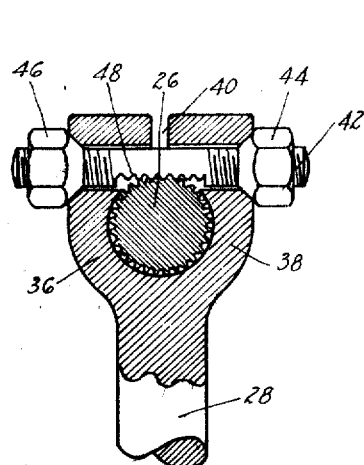
Figure 2 is a partial section through the adjustment on the line 2—2 of Figure 1.
Figure 3:
Figure 3 is a side elevation of the adjusting element.
Figure 4:
Figure 4 is a bottom plan view of the adjusting element.

In the arrangement described above, the end of shaft 26 is formed with parallel gear teeth or serrations 36, preferably flattened on top so that they will not bite into the metal of arm 28, while the arm 28 is formed with a hub 38 embracing the end of the shaft and split at 40 so that it may be contracted upon the shaft. Hub 38, as best appears in Figure 2, is provided with a bore at right angles to the slot 40, and intersecting the bore for shaft 28, for an adjusting ement or novel rack 42 shown separately in Figures 3 and 4, the cross bore being countersunk or provided with conical depressions at its ends for the conical bases of nuts 44 and 46 threaded on the ends of rack 42.

The rack or adjusting element 42 is cylindrical in form, preferably substantially smaller in diameter than its cross bore in hub 38, and is threaded at its ends for nuts 44 and 46. At its center, by a broaching or milling operation, it is cut away to provide a flattened portion formed with transverse gear or rack teeth 48 meshing with teeth 36 on shaft 26. The teeth 48, in engagement with teeth 36 of the shaft, also serve the function of preventing rack 42 from turning about its longitudinal axis in the cylindrical bore in hub 38. It should be particularly noted that rack 42 bridges across slot 40, so that it not only serves as an adjusting element, but also (by tightening nuts 44 and 46) serves to contract the split hub 38 to clamp arm 28 firmly on shaft 26.

The parts are assembled by inserting rack 42 in its bore in hub 88, and then sliding hub 38 axially in place over the end of shaft 26, with teeth 48 in mesh with teeth 36. With arm 28 in its desired angular position on the shaft, nuts 44 and 46 are tightened, clamping the arm on the shaft by contracting hub 38.

When it is desired to adjust shaft 26 and arm 28, or their equivalents, angularly with respect to each other, first one of the nuts 44 or 46 is backed off the required number of turns and then the other nut is tightened, thus moving element 42 lengthwise to effect the desired adjustment and at the same time again clamping the arm on the shaft.

The looseness with which element 42 fits in its cross bore facilitates the adjusting movements, and also permits arranging the parts so that the conical bases of nuts 44 and 46 serve to draw teeth 48 downwardly into firm mesh with teeth 36 as the one nut or the other is tightened. The conical depressions or countersunk portions are not necessarily coaxial with respect to the cross-bore, and therefore element 42 and its cross-bore are not necessarily coaxial when the arm 28 is clamped in place, but I find it more convenient from a manufacturing standpoint to make them thus coaxial.

I prefer to groove the shaft 26 to receive a snap ring or the like 50, the ring 50 and cam 24 serving to engage opposite ends of the shaft bearing or bracket and thus preventing any axial movement of the shaft 26 while arm 28 is being adjusted.

While one illustrative embodiment has been described in detail, it is not my intention to limit the scope of the invention to that particular embodiment, or otherwise than by the terms of the appended claims.

I claim:

1. An operating device comprising, in combination, a shaft, an arm having a hub encircling the shaft and slotted on the side opposite the arm, and a member operatively engaging the shaft and bridging across the slotted part of the hub and movable lengthwise to adjust the arm and shaft angularly with respect to each other.

2. An operating device comprising, in combination, a shaft, an arm having a hub encircling the shaft and slotted on the side opposite the arm, a member operatively engaging the shaft and bridging across the slotted part of the hub and movable lengthwise to adjust the arm and shaft angularly with respect to each other, and means engaging said member and operable to contract the slotted hub about the shaft.

3. An operating device comprising, in combination, a shaft, an arm having a hub encircling the shaft and slotted on the side opposite the arm, and a member operatively engaging the shaft and bridging across the slotted part of the hub and movable lengthwise to adjust the arm and shaft angularly with respect to each other, together with means engaging said member and operable to shift it lengthwise and then contract the slotted hub.

4. An operating device comprising, in combination, a shaft, an arm having a hub encircling the shaft and slotted on the side opposite the arm, and a member operatively engaging the shaft and bridging across the slotted part of the hub and movable lengthwise to adjust the arm and shaft angularly with respect to each other, together with nuts threaded on opposite ends of said member and engaging opposite sides of the hub and operable to shift said member lengthwise and then contract the slotted hub.

5. An operating device comprising, in combination, a shaft having pinion teeth, an arm having a hub encircling the shaft and slotted on the side opposite the arm, and a rack member meshing with the pinion teeth and bridging across the slotted part of the hub and movable lengthwise to adjust the arm and shaft angularly with respect to each other.

6. An operating device comprising, in combination, a shaft having pinion teeth, an arm having a hub encircling the shaft and slotted on the side opposite the arm, a rack member meshing with the pinion teeth and bridging across the slotted part of the hub and movable lengthwise to adjust the arm and shaft angularly with respect to each other, and means engaging the rack member and operable to contract the hub.

7. An operating device comprising, in combination, a shaft having pinion teeth, an arm having a hub encircling the shaft and slotted on the side opposite the arm, and a rack member meshing with the pinion teeth and bridging across the slotted part of the hub and movable lengthwise to adjust the arm and shaft angularly with respect to each other, together with nuts threaded on opposite ends of the rack member and operable to contract the hub.

8. An operating device comprising, in combination, a shaft having pinion teeth, an arm having a hub encircling the shaft and slotted on the side opposite the arm, and a rack member meshing with the pinion teeth and bridging across the slotted part of the hub and movable lengthwise to adjust the arm and shaft angularly with respect to each other, together with nuts having tapered bases and threaded on opposite ends of the rack member and operable to contract the hub, the hub having countersunk recesses to receive the tapered bases of the nuts.

9. An operating device comprising, in combination, a cam and shaft, the shaft being grooved, a snap ring in the groove, a shaft bearing engaged on opposite sides by the cam and the snap ring to prevent axial movement of the shaft, pinion teeth on the shaft beyond the snap ring, an arm having a hub embracing the end of the shaft, and a rack member carried by the hub and meshing with the pinion teeth and operable to adjust the arm and shaft angularly with respect to each other.

10. An operating device comprising, in combination, a cam and shaft, a shaft bearing engaged on one side by the cam, a part on the shaft engaging the other side of the shaft bearing and with the cam serving to prevent axial movement of the shaft, pinion teeth on the shaft beyond said part, an arm having a hub embracing the end of the shaft, and a rack member carried by the hub and meshing with the pinion teeth and operable to adjust the arm and shaft angularly with respect to each other.

11. An operating device comprising, in combination, a cam and shaft, a shaft bearing engaged on one side by the cam, a part on the shaft engaging the other side of the shaft bearing and with the cam serving to prevent axial movement of the shaft, and an arm adjustably mounted on the shaft beyond said part.

12. An operating device comprising, in combination, a cam and shaft, the shaft being grooved, a snap ring in the groove, a shaft bearing engaged on opposite sides by the cam and the snap ring to prevent axial movement of the shaft, and an arm adjustably mounted on the shaft beyond the snap ring.

13. An operating device comprising, in combination, a shaft, an arm having a hub formed with a cylindrical bore receiving the shaft and with a cylindrical cross bore intersected by one side of the shaft in the first bore, and a member cylindrical at least at its ends and arranged in the cross bore in engagement with the shaft and movable lengthwise to adjust the shaft and arm angularly with respect to each other.

14. An operating device comprising, in combination, a shaft, an arm having a hub formed with a cylindrical bore receiving the shaft and with a cylindrical cross bore intersected by one side of the shaft in the first bore, and a cylindrical member in the cross bore having a flattened intermediate portion in engagement with the shaft and which member is movable to adjust the shaft and arm angularly with respect to each other.

15. An operating device comprising, in combination, a shaft, an arm having a hub formed with a cylindrical bore receiving the shaft and with a cylindrical cross bore intersected by one side of the shaft in the first bore, and a cylindrical member in the cross bore having a flattened intermediate portion in engagement with the shaft and which member is movable to adjust the shaft and arm angularly with respect to each other, the shaft having pinion teeth and the flattened intermediate portion of said member having rack teeth meshing with said pinion teeth.

16. An operating device comprising, in combination, a shaft, an arm having a hub formed with a cylindrical bore receiving the shaft and with a cylindrical cross bore intersected by one side of the shaft in the first bore, and a cylindrical member in the cross bore having a flattened intermediate portion in engagement with the shaft and which member is movable to adjust the shaft and arm angularly with respect to each other, together with nuts threaded on opposite ends of said member and engaging opposite sides of said hub.

17. An operating device comprising, in combination, a shaft, an arm having a hub formed with a cylindrical bore receiving the shaft and with a cylindrical cross bore intersected by one side of the shaft in the first bore, and a cylindrical member in the cross bore having a flattened intermediate portion in engagement with the shaft and which member is movable to adjust the shaft and arm angularly with respect to each other, together with nuts threaded on opposite ends of said member and engaging opposite sides of said hub, the hub being slotted so that the nuts can be operated first to shift said member to make the adjustment and then to contract the hub about the shaft.

18. A cylindrical adjusting member threaded at least at its ends and having a flattened intermediate portion formed with rack teeth.

19. A cylindrical adjusting member having a flattened intermediate portion formed with rack teeth.

20. A cylindrical adjusting member threaded at least at its ends and having a flattened intermediate portion formed with rack teeth, in combination with a nut threaded on each end of said member and formed with a tapered base.

21. A cam formed with an integral shaft extending from its side and formed with pinion teeth at its end.

22. A cam formed with an integral shaft extending from its side and formed with pinion teeth at its end and grooved to receive a snap ring between the cam and the pinion teeth.

In testimony whereof, I have hereunto signed my name.

EUGENE G. McDONALD.